United States Patent Office 2,907,381
Patented Oct. 6, 1959

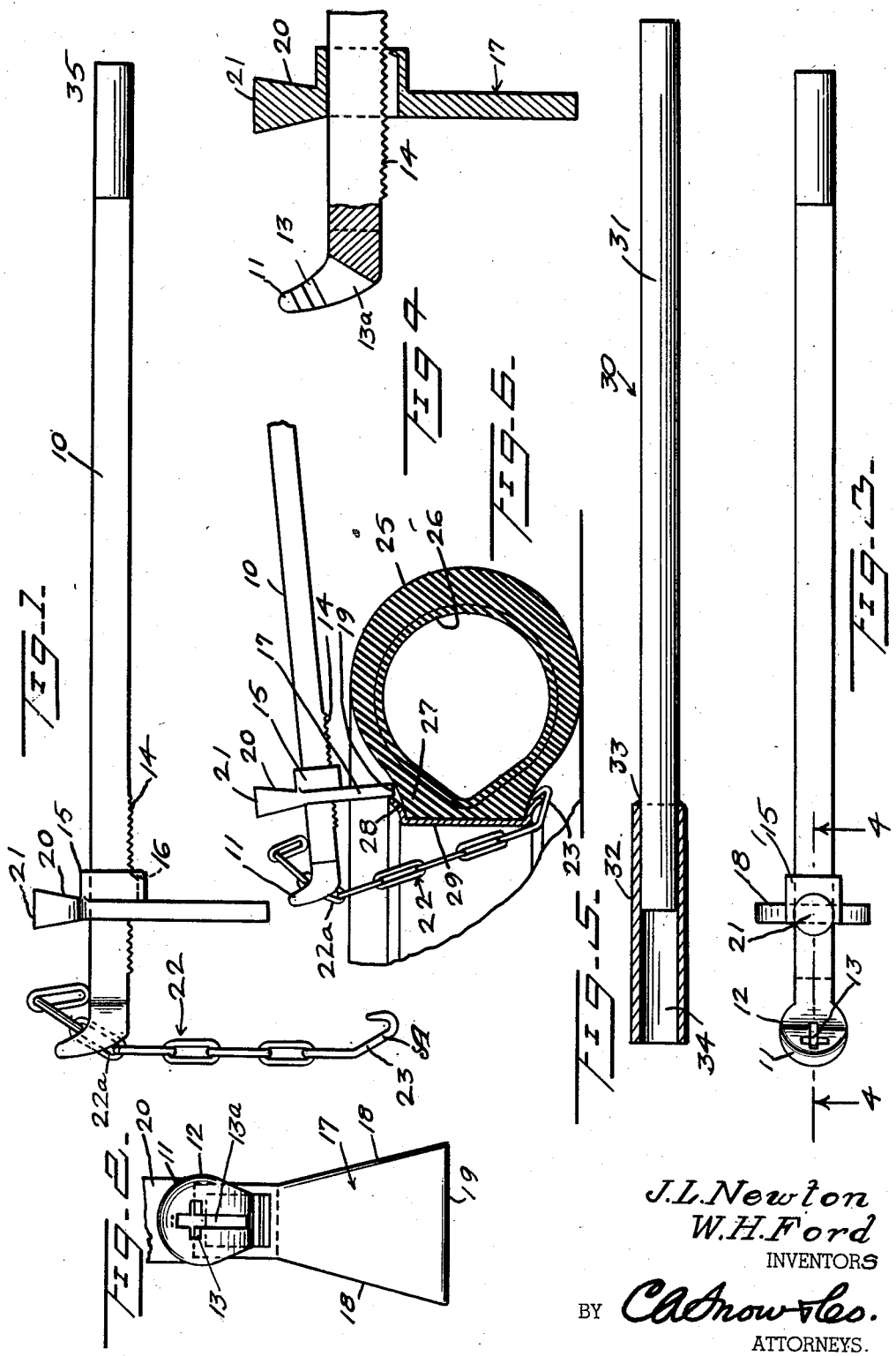

2,907,381

TIRE MOUNTING AND DISMOUNTING TOOL

Joseph L. Newton and William H. Ford, Arcadia, Fla.

Application March 12, 1957, Serial No. 645,487

1 Claim. (Cl. 157—1.26)

This invention relates to a tire mounting and dismounting tool, and has as its primary object the provision of an improved tool of this nature having components which may be applied oppositely to the rim and bead of the tire along both sides of the tire to exert equal and opposite pressures on both rim and bead on both sides of the tire to facilitate removal of the tire from the rim or reapplication of the tire thereto.

An additional object of the invention is the provision of a device of this character provided with means for varying the effective size of the device for employment upon tires and rims of different dimensions.

Still another object of the invention is the provision of a device of this character incorporating an apertured end through which a chain is adapted to pass, the chain having a hook on the end thereof, and means in the apertured end for selectively engaging a desired link of the chain in accordance with the size of the rim to be operated on.

Still another object of the invention is the provision of a device which is sufficiently strong to be usable upon the largest of standard tires to readily effect the mounting or dismounting of the tire on the rim.

A further object of the invention is the provision of a device of this character which is sturdy and durable in construction, reliable and efficient in operation, and relatively simple and inexpensive to manufacture, assemble and utilize.

Still other objects will in part be obvious, and in part be pointed out hereinafter and shown in the accompanying drawing wherein there is disclosed a preferred embodiment of this inventive concept.

In the drawings:

Figure 1 is a side elevational view of one form of the device embodying features of the instant invention.

Figure 2 is an end elevational view of the construction of Figure 1 as viewed from the left, shown on an enlarged scale, the chain being removed.

Figure 3 is a top plan view of the construction of Figure 1.

Figure 4 is an enlarged sectional view taken substantially on line 4—4 of Fig. 3 as viewed from the direction indicated by the arrows.

Figure 5 is a side view partly in elevation and partially in section disclosing an extension adapted to be employed for amplifying the leverage of the device, and Figure 6 is a side elevational view, partially broken away of the device of the instant invention as applied to a tire rim and tire bead for effecting removal of the tire from the rim, the tire and rim being shown in section.

Similar reference characters refer to similar parts throughout the several views of the drawings.

Having reference now to the drawings in detail, the tool comprises an elongated handle 10, having an upwardly turned end portion 11 at one end, the end portion 11 comprising a flattened disk like member broadened at its sides as indicated at 12, and including a cruciform aperture 13 in the upward extension thereof. The longer, vertically extended arm or stem of the cruciform aperture is flared in the axial direction of the handle, the purpose of which will appear later. Along the under edge of lever or handle 10, are provided a plurality of teeth or serrations 14. Surrounding the portions of the bar 10, which, it should be pointed out, is preferably of rectangular configuration, there is a sleeve 15, forming a rectangular opening 16, of a width substantially equal to the exterior perimeter of lever 10, but sufficiently larger to permit sliding of the sleeve along the bar or lever. The recess formed interiorly of the sleeve is longer or deeper than its width, to provide a space between the bottom of the sleeve and the serrations 14, whereby play may be permitted between the sleeve and the bar or lever to permit engagement of an upturned edge of the bottom of the sleeve with the selected serration, for a purpose to be more fully described hereinafter.

Depending from the lower edge of the sleeve 15 is a blade 17, which tapers outwardly as indicated at 18, to form a relatively wide contacting surface 19 at the lower end thereof. Extending upwardly from the top of sleeve 15 is a projection 20, in the form of an inverted truncated cone, which provides a head 21 to which may be applied a hammer or other pounding tool if necessary.

A link chain generally indicated at 22 is adapted to be inserted through the cruciform aperture 13 in the upturned portion 11, and drawn through cross arm thereof until a desired link providing a desired length of chain extends downwardly from portion 11, whereupon the inserted link 22a is wedged inwardly into the flared portion of the stem 13a of the cruciform opening.

The chain 22 terminates in a hook shaped member 23, slightly offset as at A.

One method of employing the device is shown in Figure 6, wherein a tire 25 having an inner tube 26 and a bead 27 is mounted within the flared flanges 28 of a rim 29. In order to disengage the bead of the tire 25 from the flanges 28 the blade member 19 is positioned as shown in Figure 6 at the edge of the flange 28 of rim 29, and in abutting relation with the bead 27 of the tire. The lever or bar 10 is then adjusted to a desired length, by oscillatory movement of lever 10 within sleeve 15, until a desired serration, giving the front end of lever 10 a desired extension, is reached, whereupon downward pressure on lever 10 will serve to engage such a serration. The hook 23 is then engaged about the opposite side or flange 28 of rim 29, and the chain 22 tightened within cruciform slot 13, until a desired pressure is achieved. Downward pressure on lever 10 will then occasion a clamping action between the bottom of sleeve 15 and its associated serration 14, whereupon blade 18 will exert pressure in one direction on its associated flange 28, and in another direction on the adjacent bead 27. Simultaneously the chain will act to bias the opposite flange 28 outwardly of the bead, to effect a leverage on the opposite sides of the beads, and loosening the bead from the rim to permit the ready withdrawal of the bead of the tire from the rim.

When employing the device for reinsertion of a tire bead within a rim, the parts may be positioned as shown, at which time a downward pressure on the lever 10 will press an unseated bead 27 to confine the same within the flanges 28 of the rim 29. If the pressure so exerted is insufficient, the use of a hammer or similar device on the head 21 will amplify the pressure until the tire and rim are reassembled.

When the device is employed for unusually heavy duty, an extension 30, as best shown in Figure 5 may be employed. The extension 30 comprises an elongated rod or bar 31, to the inner end of which is secured a rectangular extension 32, as by welding 33, or the like. The portion 32 extends a substantial distance beyond the end of member 30, to provide a rectangular recess 34 which may be fitted over the end 35 of lever 10, thus affording an elongated operating handle having greater leverage.

From the foregoing it will now be seen there is herein provided an improved tire mounting and dismounting tool, which accomplishes all of the objects of this invention, and others, including many advantages of great practical utility and commercial importance.

As many embodiments may be made of this inventive concept, and as many modifications be made in the embodiment herein before shown and described, it is to be understood that all matter herein is to be interpreted merely as illustrative and not in a limiting sense.

What we claim as our invention is:

A device of the character described, an elongated handle member, an upturned flattened end portion having cruciform opening therein at one end of said handle member, a link chain passed through said opening, the vertically extending stem of the cruciform opening being flared in the axial direction of the handle so that a link of the chain may be passed through the cross arm thereof and wedgedly engaged in the stem of the same, a hook on the extending end of said chain for engaging a flange on the side of a tire rim, a sleeve movable on said handle member, an opening in said sleeve adapted to surround said handle member, an upwardly extending blade in the lower wall of said opening, serrations on the under side of said handle member and engageable with said upwardly extending blade, a depending blade member extending from said sleeve for engagement with the other flange of the tire rim and the bead of the tire carried thereby, and an enlarged head on said sleeve on the side thereof opposite said blade member.

References Cited in the file of this patent

UNITED STATES PATENTS

| | | |
|---|---|---|
| 1,567,276 | Kowalzcyk et al. | Dec. 29, 1925 |
| 1,632,732 | Green | June 14, 1927 |
| 2,148,111 | Dennis | Feb. 21, 1939 |
| 2,391,626 | Howard | Dec. 25, 1945 |
| 2,474,926 | York | July 5, 1949 |
| 2,489,088 | Hewitt | Nov. 22, 1949 |
| 2,573,233 | Verdick et al. | Oct. 30, 1951 |

FOREIGN PATENTS

| | | |
|---|---|---|
| 817,844 | France | Sept. 11, 1937 |